United States Patent
Lichius et al.

(10) Patent No.: US 11,217,801 B2
(45) Date of Patent: Jan. 4, 2022

(54) VEHICLE HAVING A FUEL CELL SYSTEM, AND METHOD FOR TREATING A FLUID EMERGING FROM THE FUEL CELL SYSTEM

(71) Applicant: AUDI AG, Ingolstadt (DE)

(72) Inventors: Thomas Lichius, Gaimersheim (DE); Herbert Böll, Ingolstadt (DE); Johannes Weis, Neuburg (DE); Thomas Weustenfeld, Briarwood, NY (US)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/770,037

(22) PCT Filed: Oct. 1, 2018

(86) PCT No.: PCT/EP2018/076589
§ 371 (c)(1),
(2) Date: Jun. 4, 2020

(87) PCT Pub. No.: WO2019/110165
PCT Pub. Date: Jun. 13, 2019

(65) Prior Publication Data
US 2020/0388864 A1  Dec. 10, 2020

(30) Foreign Application Priority Data
Dec. 5, 2017  (DE) ..................... 10 2017 221 896.7

(51) Int. Cl.
*H01M 8/04119* (2016.01)

(52) U.S. Cl.
CPC ... *H01M 8/04171* (2013.01); *H01M 8/04141* (2013.01); *H01M 2250/20* (2013.01)

(58) Field of Classification Search
CPC ......... B60K 13/04; B60L 50/71; B60L 50/72; H01M 2250/20; H01M 8/04141; H01M 8/04171; Y02E 60/50; Y02T 90/40
See application file for complete search history.

(56) References Cited

U.S. PATENT DOCUMENTS

| | | |
|---|---|---|
| 2007/0077473 A1 | 4/2007 | Schwab |
| 2010/0055508 A1 | 3/2010 | Renn |
| (Continued) | | |

FOREIGN PATENT DOCUMENTS

| | | |
|---|---|---|
| DE | 199 18 849 A1 | 10/2000 |
| DE | 10 2008 032 792 A1 | 5/2009 |
| (Continued) | | |

OTHER PUBLICATIONS

Costamagna, P. et al., "Quantum jumps in the PEMFC science and technology from the 1960s to the year 2000 Part II. Engineering, technology development and application aspects", Journal of Power Sources, pp. 253-269, 2001.

*Primary Examiner* — Adam A Arciero
(74) *Attorney, Agent, or Firm* — Seed Intellectual Property Law Group LLP

(57) ABSTRACT

A vehicle is provided having a vehicle front end in which a fuel cell system which has a fuel cell stack is arranged, which full cell system is, at a cathode side, connected at least directly to an exhaust-gas line through which a fluid emerging from the fuel cell stack can be discharged from the vehicle front end. The exhaust-gas system comprises a sorption system for the adsorption of a liquid of the fluid emerging from the fuel cell stack. The invention furthermore relates to a method for treating a fluid of a fuel cell system, which has a fuel cell stack, in a vehicle.

8 Claims, 4 Drawing Sheets

(56) References Cited

U.S. PATENT DOCUMENTS

2012/0055183 A1* 3/2012 Bohlen ................ B60H 3/024
62/91
2016/0064765 A1 3/2016 Nishiyama et al.

FOREIGN PATENT DOCUMENTS

| DE | 10 2011 114 721 A1 | 4/2013 |
| DE | 10 2014 204 790 A1 | 9/2015 |
| DE | 10 2004 051 751 B4 | 11/2015 |
| EP | 2 131 436 A2 | 12/2009 |

* cited by examiner

VEHICLE HAVING A FUEL CELL SYSTEM, AND METHOD FOR TREATING A FLUID EMERGING FROM THE FUEL CELL SYSTEM

BACKGROUND

Technical Field

Embodiments of the invention relate to a vehicle, as well as to a method for treating a fluid of a fuel cell system, having a fuel cell stack, in a vehicle.

Description of the Related Art

A vehicle is known, for example, from US 2007/077473 A1, in which a sorption system is used for the storage of heat, in order to be able to heat the cathode gas at cold temperatures and thus to be able to start the fuel cell system even in cold temperatures.

A fuel cell system having a sorption system for storing and heating cathode gas is also disclosed in DE 10 2011 114 721 A1.

Furthermore, US 2016/0064765 A1 is known.

A disadvantage of the prior art is that, at low speeds of the vehicle or, in particular, at standstill, the fluid exiting the fuel cell system or even the escaping hot water vapor could be blown onto pedestrians. In practice, therefore, the exhaust-gas line is not conducted out of the vehicle body laterally, but is conducted at its back end. However, such an exhaust-gas line routed to the back end requires a lot of installation space. In addition, in a fuel-cell vehicle, the exhaust-gas line must be routed around a battery integrated in an underbody of the vehicle.

BRIEF SUMMARY

It is therefore an object of embodiments of the present invention to further develop a vehicle and a method of the type mentioned at the outset in such a way that the above-mentioned disadvantages are reduced.

A vehicle may include an exhaust system that can be adjusted between an adsorption configuration, in which the liquid-containing fluid can be conducted to the sorption system and thus the liquid can be adsorbed thereby, and a passage configuration, in which the liquid-containing fluid can be discharged from the vehicle front end. In this case, the exhaust system will be in the adsorption configuration when the vehicle falls below a predefined or predeterminable limit speed, in particular when the vehicle is at a standstill. Furthermore, the exhaust system will be in the passage configuration as soon as the vehicle exceeds a predefined or predeterminable limit speed, in particular when the vehicle is in motion. This makes longer time intervals possible, in which the sorption system is able to adsorb or also can be loaded/ready to use. Discharging the fluid or even water vapor during travel, that is to say when a limit speed is exceeded, is harmless.

By means of the sorption system, it is now possible to bind the liquid of the fluid to an adsorption surface of the sorption system by means of adsorption. As a result, the exhaust-gas line can be routed out of the vehicle front end, in particular laterally to the longitudinal direction, from a vehicle body comprising the vehicle front end without endangering persons located in the vicinity of the vehicle. It is also possible to route the exhaust-gas line forwards out of the vehicle front end, i.e. in the longitudinal direction of the vehicle or vehicle body. It is also possible to discharge the exhaust gas from the vehicle front end upwards and/or downwards. The arrangement of the exhaust-gas line near the fuel cell system considerably reduces the installation space required within the vehicle for the exhaust system and for the exhaust-gas line compared with an exhaust system, which is routed rearwards under a vehicle floor. The space freed up in the vehicle can now be used in some other way. At the same time, a reduced size of the exhaust system leads to a reduction in the total weight of the vehicle and thus to a lower fuel consumption.

The fluid is here defined as the fluid which is discharged from the fuel cell stack on the cathode side and no longer fed back into the fuel cell stack (e.g. cathode exhaust gas). In an alternative embodiment, however, an analogously formed exhaust system for an anode fluid discharged on the anode side is also possible.

The front end of the vehicle may be the part of the vehicle that is located in front of and/or near the driver or front passenger of the vehicle. The vehicle front end may also include the area beneath the passenger compartment. Accordingly, a vehicle rear end is that part of the vehicle that is behind the driver or the front passenger or the passenger compartment. Alternatively, the vehicle rear end may also describe the part of the vehicle that is behind the back row of seats in the vehicle.

In an advantageous embodiment, the sorption system is formed as a perforated disk and is arranged in the exhaust-gas line. The sorption material may be applied to the perforated disk as bulk material. In an alternative embodiment, the sorption system is coated with the sorption material. Due to the sorption system being designed as a perforated disk, the liquid of the fluid can bind to the surface of the perforated disk or to the sorption material by means of adsorption, while the gaseous part of the fluid can be released to the outside. The sorption material may be formed from zeolite, activated carbon or silica gel. The hole geometry may be selected such that pressure loss is minimal.

The exhaust-gas line can be routed out of the vehicle body or out of the vehicle front end on the driver side or on the front passenger side. In an alternative embodiment, however, the exhaust system comprises two or more exhaust-gas lines, each of which is routed out of the vehicle body or the vehicle front end on opposite sides laterally to the longitudinal direction in order to discharge the fluid to the environment.

In order to lengthen the time intervals and to reduce the required size of the sorption system, it is provided that, in the passage configuration of the exhaust system, the liquid adsorbed in the sorption system can be desorbed and discharged from the vehicle body. The sorption system thereby becomes able to adsorb again and an over-saturation of the sorption material is counteracted. In this connection, it is advantageous for the exhaust system to comprise a heating element for evaporating the adsorbed liquid; consequently, for desorbing the liquid from the sorption material. In this case, it is possible for the sorption system to be formed from a high-impedance and electrically conductive material, as a result of which the material of the sorption system itself functions as a heating element.

In order to further reduce the installation space required for the exhaust system, the sorption system may be arranged inside the exhaust-gas line and the sorption system may be pivotably mounted between a first position shifting the exhaust system into the adsorption configuration and a second position shifting the exhaust system into the passage configuration. The sorption system may be designed and arranged in the first position in the exhaust-gas line in such a way that the inner wall of the exhaust-gas line is circumferentially sealed. In the passage configuration, that is to say in the second position of the sorption system, it is advantageously swung to the inner wall, so that the fluid can be discharged from the vehicle front end via the exhaust-gas line.

In an alternative embodiment, it is provided that the exhaust system comprises a bypass line connected to the exhaust-gas line and routed out of the vehicle front end or the front part of the vehicle body, in which bypass line an actuator is arranged, which is adjustable between a first position putting the exhaust system into the adsorption configuration and a second position putting the exhaust system into the passage configuration. This provides a particularly robust exhaust system, since the sorption system can now be arranged fixedly in the flow cross-section of the exhaust-gas line. In the first position of the actuator, the bypass line is closed and the fluid is conducted to the sorption system. In the second position of the actuator, the bypass line is open and the fluid is conducted to the bypass line. Here, the actuator can be formed as a flap or as a valve. Alternatively, the actuator or even an additional actuating means can be arranged in the exhaust-gas line.

In order to further reduce the quantity of liquid in the fluid, it is provided in particular that the fuel cell stack be connected at the cathode outlet end via a cathode exhaust-gas line to a humidifier to which the exhaust system comprising the sorption system is at least indirectly connected at the humidifier outlet end. Unreacted cathode gas and product water reach the humidifier via the cathode exhaust-gas line. The product water is used in the humidifier for humidifying the cathode gas and the humidified cathode gas is returned to the cathodes. This reduces the quantity of product water and thus the amount of liquid in the fluid before it reaches the sorption system.

A method for treating a fluid of a fuel cell system having a fuel cell stack in a vehicle with a vehicle front end, in particular with a vehicle body extending in the longitudinal direction, wherein an exhaust system having a sorption system is provided, which is connected at least indirectly to the fuel cell stack on the cathode side, may comprise:

(a) conducting the liquid-containing fluid of the fuel cell system to the exhaust system, and (b) shifting the exhaust system into an adsorption configuration and thereby adsorbing the liquid of the fluid by means of the sorption system when the vehicle falls below a predetermined or predeterminable limit speed, or (c) shifting the exhaust system into a passage configuration and thereby discharging the fluid by means of the exhaust system from a front end of the vehicle when a predetermined or predeterminable limit speed is exceeded.

This prevents water vapor or a liquid or a fluid from being directed onto passers-by next to the vehicle when the vehicle is at a standstill or when the vehicle is travelling slowly. By the exhaust system being put into the passage configuration, the fluid is discharged from the vehicle body or the vehicle front end during travel. This makes it possible to make the sorption system smaller, since the sorption system is used only when the limit speed is not reached or liquid is being adsorbed.

To be able to make the exhaust-gas line and the sorption system even smaller, it is provided in particular that, in the passage configuration, the liquid adsorbed in the sorption system is desorbed and/or discharged.

As a result of this desorption, the sorption system is 'unloaded' again, i.e. the liquid molecules no longer bind to the surface of the sorption system. This lengthens the time interval of adsorption capability and counteracts any oversaturation of the sorption system. Advantageously, the method additionally comprises an evaporation of the desorbed liquid.

In one embodiment, it is provided that the method comprises the following further steps:
  shifting the exhaust system into the adsorption configuration by pivoting into a first position the sorption system arranged inside an exhaust-gas line of the exhaust system, or
  shifting the exhaust system into the passage configuration by pivoting into a second position the sorption system arranged inside an exhaust-gas line of the exhaust system.

In the first position, the sorption system may be arranged in a manner oriented in a cross-sectional plane of the exhaust-gas line. The sorption system may seal off the exhaust-gas line circumferentially.

In an alternative embodiment, it is advantageous for the method to comprise the following further steps:
  shifting the exhaust system into the adsorption configuration by closing a bypass line connected to an exhaust-gas line of the exhaust system, or
  shifting the exhaust system into the passage configuration by opening a bypass line connected to the exhaust-gas line of the exhaust system, and desorbing and/or discharging via the bypass line the liquid and/or the fluid adsorbed in the sorption system from the vehicle front end or the vehicle body of the vehicle.

BRIEF DESCRIPTION OF THE SEVERAL VIEWS OF THE DRAWINGS

Additional advantages, features and details are provided in the following description of embodiments and on the basis of the drawings. The following is shown.

DETAILED DESCRIPTION

Figure 1:
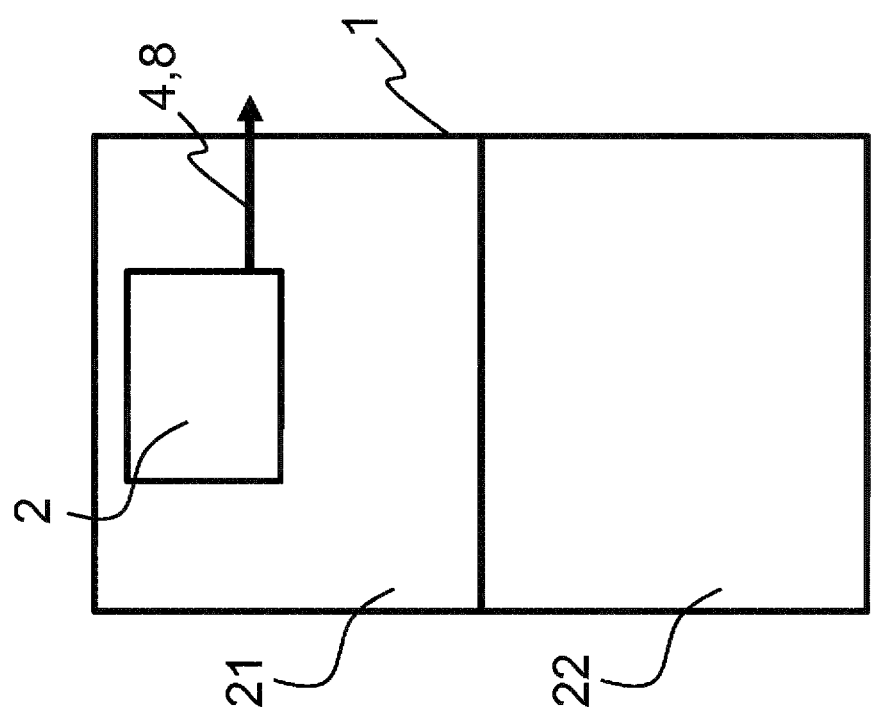
FIG. 1 is a schematic representation of a first embodiment of a vehicle according to the invention.

FIG. 1 shows a schematic representation of the vehicle with a longitudinally extending vehicle body 1 comprising a vehicle rear end 22 and a vehicle front end 21. A fuel cell system 2 is arranged in the vehicle front end 21. The fuel cell system 2 comprises a fuel cell stack 3, not shown in FIG. 1, which is connected at the cathode side 21 at least indirectly to an exhaust-gas line 4. A fluid exiting the fuel cell stack 3 can be discharged through the exhaust-gas line 4 from the vehicle front end 21 and thus from the vehicle body 1. In the present case, the fluid can be discharged from the vehicle front end 21 of the vehicle laterally to the longitudinal direction.

Figure 2:
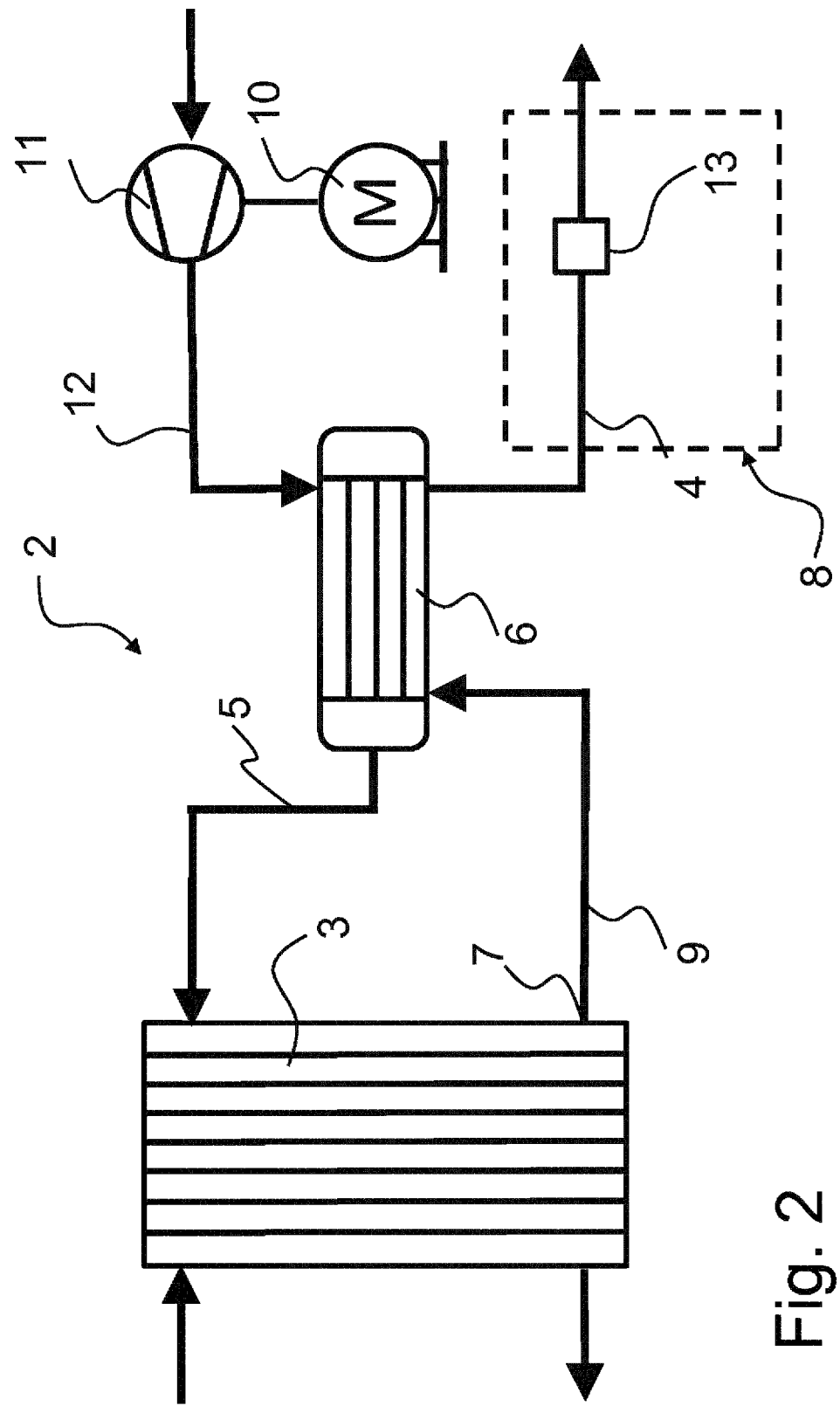
FIG. 2 is a schematic illustration of a first embodiment of an exhaust system according to the invention in a vehicle.

FIG. 2 shows a first embodiment of the exhaust system 8 according to the invention in a vehicle. On the cathode side, the cathode gas is routed through a compressor 11 driven by means of a drive 10 to a humidifier 6 via a dry feed line 12. In the humidifier 6, the cathode gas is humidified and conducted via a wet feed line 5 into the cathode chambers of the fuel cell stack 3. At the cathode outlet 7, unreacted cathode gas and product water are conducted via the cathode exhaust-gas line 9 to the humidifier 6. The cathode gas is humidified, among other things, with the product water in the humidifier 6 and conducted to the cathodes. In order to counteract an over-saturation of the humidifier 6, a portion of the unreacted cathode gas and of the product water is conducted out of the vehicle body 1 laterally to the longitudinal axis or to the longitudinal direction as a fluid via the exhaust-gas line 4.

The exhaust-gas line 4 is to be regarded as part of an exhaust system 8, which comprises a sorption system 13 for adsorbing a liquid of a fluid exiting the fuel cell stack 3. In the present case, the sorption system 13 is formed as a perforated disk to which sorption material, for example in the form of bulk material, is applied. The exhaust system 8 is movable between an adsorption configuration and a passage configuration. In the adsorption configuration, the fluid flowing out of the cathode spaces and containing the liquid can be conducted to the sorption system 13. The liquid is thereby adsorbed by the sorption system 13. In the passage configuration, the fluid containing the liquid can be discharged from the vehicle front end 21, in the present case from the vehicle body 1, laterally to the longitudinal direction of the vehicle. The sorption system 13 may be additionally designed to desorb adsorbed liquid in the passage configuration, as a result of which it can likewise be conducted out of the front end 21 of the vehicle body 1.

In the first embodiment, the sorption system 13 is arranged inside the exhaust-gas line 4 and is pivotably mounted between a first position 14 which shifts the exhaust system 8 into the adsorption configuration and a second position 15 which shifts the exhaust system 8 into the passage configuration.

Figure 4A:
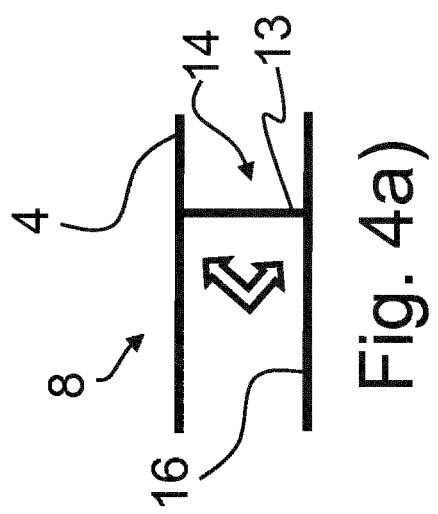
FIG. 4(a) is a section of the exhaust system of the first embodiment in an adsorption configuration.

FIG. 4(a) shows a section of the exhaust system with the sorption system 13 in the first position 14. The exhaust system 8 here is in the adsorption configuration. The sorption system 13 may be designed and arranged in the exhaust-gas line 8 in such a way that, in the first position 14, an inner wall 16 of the exhaust-gas line 4 is circumferentially sealed. The sorption system 13 is thus pivoted into the flow cross-section of the exhaust-gas line 4 in such a way that no fluid can pass through circumferentially between the sorption system 13 and the exhaust-gas line 4. The fluid is thus forced to flow to the sorption system 13. The liquid in the fluid is adsorbed in the sorption system 13. The sorption system 13 may, however, be permeable to the gaseous part of the fluid.

Figure 4B:
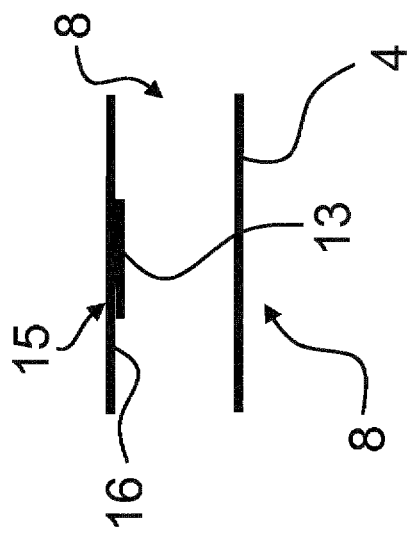
FIG. 4(b) is a section of the exhaust system of the first embodiment in a passage configuration.

FIG. 4(b) shows a section of the exhaust system 8 in the passage configuration, in which the sorption system 13 is in the second position 15. The sorption system 13 is pivoted toward the inner wall 16 of the exhaust-gas line 4 and may bear against it. The exhaust-gas line 4 is thereby released for a flow-through of the fluid coming from the cathode spaces.

Figure 3:
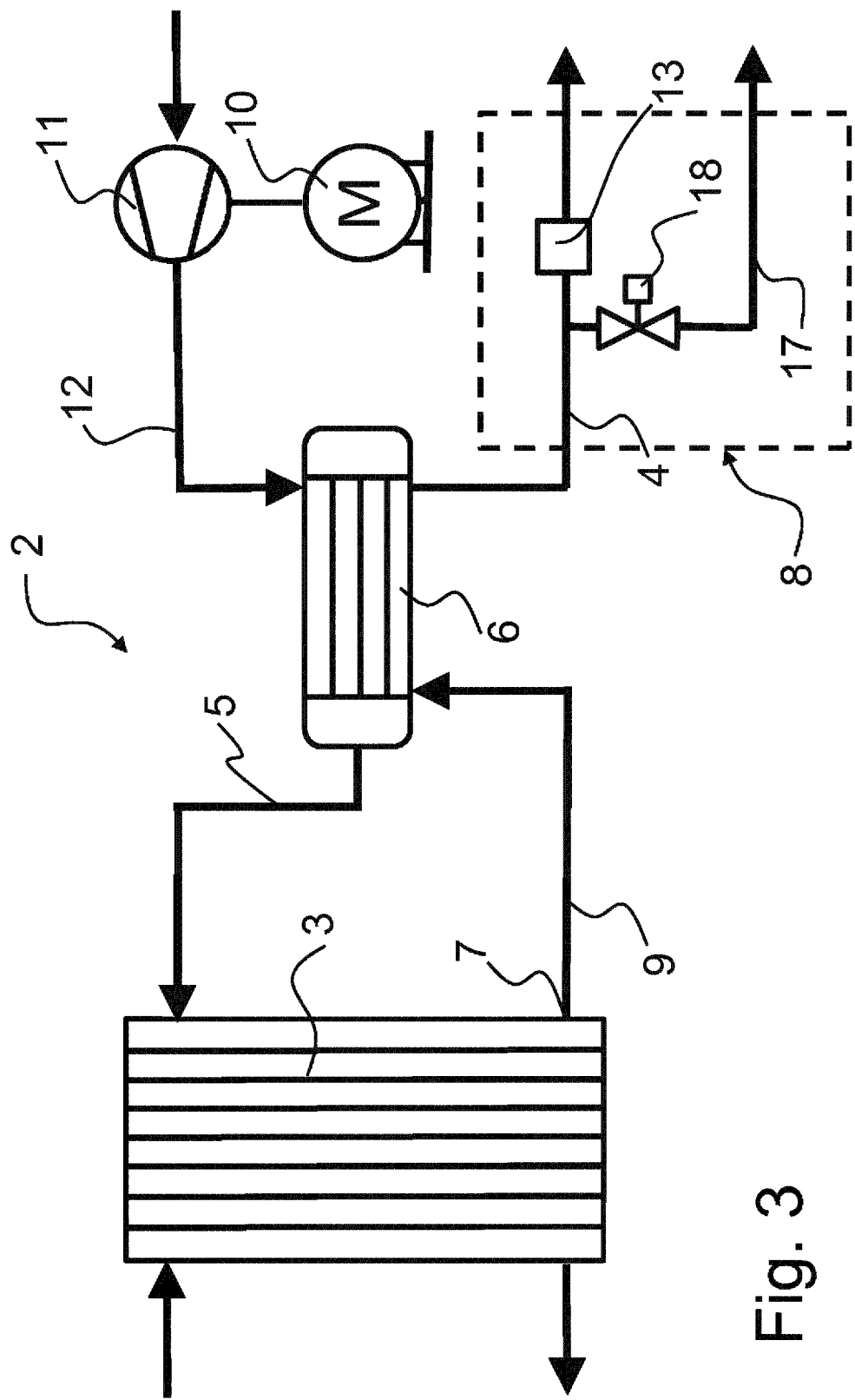
FIG. 3 is a schematic representation of a second embodiment of an exhaust system according to the invention in a vehicle.

FIG. 3 shows a second embodiment of the vehicle according to the invention, wherein the exhaust system 8 comprises a bypass line 17 which is connected to the exhaust-gas line 4 and routed out of the vehicle front end 21, in particular oriented laterally to the longitudinal direction of the vehicle body 1. An actuator 18 embodied as a valve is arranged in the bypass line 17. This is adjustable between a first position 19 which shifts the exhaust system 8 into the adsorption configuration and a second position 20 which shifts the exhaust system 8 into the passage configuration.

Figure 5A:
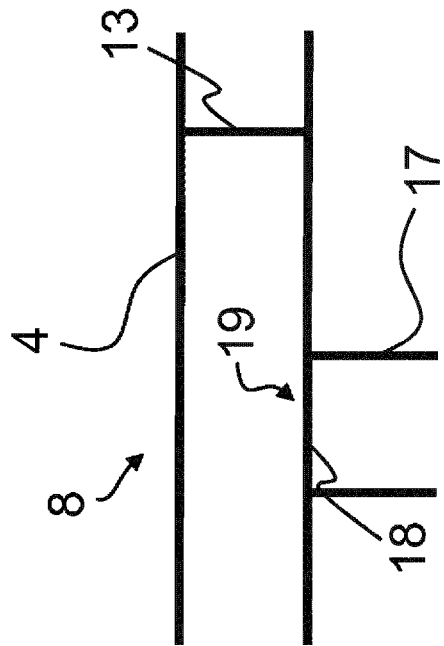
FIG. 5(a) is a section of the exhaust system of the second embodiment in an adsorption configuration.
Figure 5B:
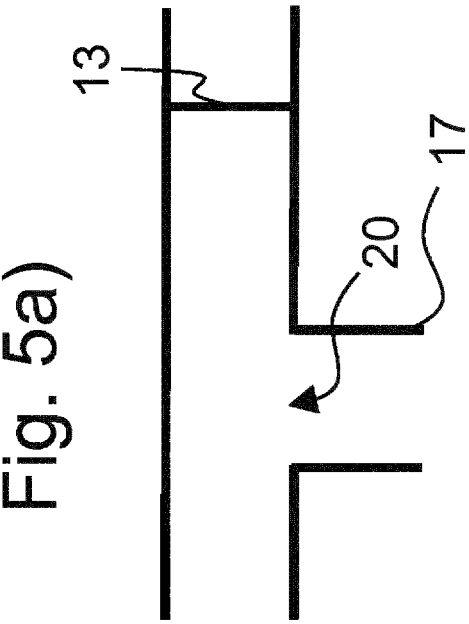
FIG. 5(b) is a section of the exhaust system of the second embodiment in a passage configuration.

A section of the exhaust system 8 of the second embodiment in the adsorption configuration is shown in FIG. 5(a). This shows the actuator 18 in a first position 19 closing the bypass line 17. In this case, the fluid is conducted to the sorption system 13, wherein its liquid is adsorbed. FIG. 5(b) shows the actuator 18 in the second position 20 releasing the bypass line 17. The fluid flowing out of the cathode spaces is conducted out of the vehicle front end 21 via the bypass line 17. The second position 20 of the actuator 18 thus corresponds to the passage configuration of the exhaust system 8. In addition, the adsorbed liquid can be desorbed using a heating element assigned to the sorption system 13 and also be discharged from the vehicle to the environment via the bypass line 17 and/or the exhaust-gas line 4. In this connection, the liquid can also be vaporized so that the vapor—instead of a liquid—is conducted out of the vehicle.

In an embodiment which is not shown in detail, the actuator 18 is arranged in the exhaust-gas line 17 in such a way that the bypass line 17 is closed in the first position 19 of the actuator 18. However, the section of the exhaust-gas line 8 leading to the sorption system 13 and formed as a sorption line is open or accessible, so that liquid is adsorbed in the sorption system 13. In the second position 20 the bypass line 17 is opened or released, the sorption line being closed. The liquid adsorbed by the sorption system 13 is then desorbed and conducted via the exhaust-gas line 8 out of the vehicle front end 21, in particular laterally to the longitudinal direction of the vehicle body 1. In this case, the desorbed liquid can be vaporized by means of a heating element of the sorption system 13 which is not shown in detail, so that now the vapor—instead of a liquid—is discharged via the exhaust-gas line 8 to the environment.

A method may proceed as follows: The liquid-containing fluid of the fuel cell system 2 is conducted to the exhaust system 8. The exhaust system 8 is put into the adsorption configuration when a predetermined or a predeterminable limit speed of the vehicle is not reached, so that the liquid of the fluid is adsorbed by the sorption system 13. However, no later than when the vehicle is at a standstill or the vehicle is stopping, the exhaust system 8 is shifted into the adsorption configuration. This process can be controlled, for example, by means of a controller, not shown in detail.

In the first embodiment shown, the exhaust system 8 is put into the adsorption configuration by the sorption system 13 being pivoted into the flow cross-section of the exhaust-gas line 4 and thus moved into the first position 14. In the second embodiment shown, the exhaust system 8 is put into the adsorption configuration by closing the bypass line 17 by means of the actuator 18.

When the vehicle exceeds a predetermined or predeterminable limit speed, the exhaust system 8 will be put into the passage configuration, as a result of which the fluid is discharged from the front vehicle 21, such as laterally to the longitudinal direction of the vehicle body 1 by means of the exhaust system 8. The liquid adsorbed in the sorption system 13 may be desorbed at the same time and discharged—e.g., as vapor—via a heating unit, not shown in detail.

In the first embodiment, the exhaust system 8 is put into the passage configuration by pivoting the sorption system 13 inside the exhaust-gas line 4 into the second position 15. In the second embodiment, the exhaust system 8 is put into the passage configuration by opening or releasing the bypass line 17 by means of the actuator 18. Desorbed liquid and/or the fluid may here be conducted out of the vehicle front end 21 via the bypass line 17.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle, comprising:
a vehicle front end;
a fuel cell system having a fuel cell stack arranged at the vehicle front end; and
an exhaust system including an exhaust-gas line connected at least indirectly to a cathode side of the fuel cell stack,
wherein the exhaust system includes a sorption system for adsorbing a liquid of a fluid exiting the fuel cell stack through the exhaust-gas line, and
wherein the exhaust system is configured to be adjusted to an adsorption configuration, in which the fluid and the liquid can be conducted to the sorption system and the liquid can be adsorbed by the sorption system, when a speed of the vehicle is less than a predetermined limit speed, and to be adjusted to a passage configuration, in which the fluid and the liquid can be discharged from the vehicle front end, when the speed of the vehicle is greater than the predetermined limit speed.

2. The vehicle according to claim 1 wherein, in the passage configuration of the exhaust system, the liquid adsorbed in the sorption system can be desorbed and discharged from the vehicle front end.

3. The vehicle according to claim 1 wherein the sorption system is arranged inside the exhaust-gas line, and the sorption system is mounted so that it can pivot between a first position, which puts the exhaust system into the adsorption configuration, and a second position, which puts the exhaust system into the passage configuration.

4. The vehicle according to claim 1 wherein the exhaust system comprises a bypass line which is connected to the exhaust-gas line and is routed out of the vehicle front end and in which an actuator is arranged, the actuator adjustable between a first position, putting the exhaust system into the adsorption configuration, and a second position, putting the exhaust system into the passage configuration.

5. The vehicle according to claim 1 wherein the fuel cell stack is connected at a cathode outlet end via a cathode exhaust-gas line to a humidifier, to which the exhaust system comprising the sorption system is at least indirectly connected at a humidifier outlet end.

6. The vehicle according to claim 1 wherein the sorption system includes sorption material applied to a perforated disk.

7. The vehicle according to claim 1 wherein the sorption system is permeable to a gaseous portion of the fluid exiting the fuel cell stack through the exhaust-gas line.

8. The vehicle according to claim 1, further comprising a heater configured to vaporize the liquid.

* * * * *